United States Patent
Yun et al.

(10) Patent No.: US 9,911,416 B2
(45) Date of Patent: Mar. 6, 2018

(54) CONTROLLING ELECTRONIC DEVICE BASED ON DIRECTION OF SPEECH

(71) Applicant: QUALCOMM Incorporated, San Diego, CA (US)

(72) Inventors: Sungrack Yun, Seongnam (KR); Taesu Kim, Suwon (KR); Duck Hoon Kim, Seoul (KR); Kyuwoong Hwang, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/671,858

(22) Filed: Mar. 27, 2015

(65) Prior Publication Data

US 2016/0284350 A1 Sep. 29, 2016

(51) Int. Cl.
*G10L 21/00* (2013.01)
*G10L 15/00* (2013.01)
(Continued)

(52) U.S. Cl.
CPC .............. *G10L 15/22* (2013.01); *G06F 3/167* (2013.01); *G10L 25/48* (2013.01); *G10L 25/18* (2013.01); *G10L 25/21* (2013.01); *G10L 2015/223* (2013.01); *H04M 2250/74* (2013.01)

(58) Field of Classification Search
CPC ......... G10L 15/26; G10L 17/00; G10L 15/22; G10L 25/78; G10L 15/00; G10L 15/20; G10L 17/22; G10L 15/08; G10L 25/48; G10L 2015/223; G10L 19/02; G10L 2021/02166; G10L 25/90; G10L 21/0232; G10L 2021/02165; H04R 3/005; H04R 25/407

USPC ....... 704/270, 205, 207, 233, 246, 247, 200, 704/235, E11.003; 381/26, 92, 313–316, 381/356
See application file for complete search history.

(56) References Cited

U.S. PATENT DOCUMENTS 7,167,544 B1    1/2007  Bauer
8,073,690 B2 *  12/2011 Nakadai .................. G10L 15/20
                                                             704/233
(Continued)

FOREIGN PATENT DOCUMENTS

EP          2509070 A1   10/2012
EP          2801972 A1   11/2014
(Continued)

OTHER PUBLICATIONS

International Search Report and Written Opinion—PCT/US2016/016649—ISA/EPO—dated Mar. 31, 2016, 13 pages.

*Primary Examiner* — Feng Niu
*Assistant Examiner* — Stephen Brinich
(74) *Attorney, Agent, or Firm* — Toler Law Group, P.C.

(57) ABSTRACT

A method for controlling an electronic device in response to speech spoken by a user is disclosed. The method may include receiving an input sound by a sound sensor. The method may also detect the speech spoken by the user in the input sound, determine first characteristics of a first frequency range and second characteristics of a second frequency range of the speech in response to detecting the speech in the input sound, and determine whether a direction of departure of the speech spoken by the user is toward the electronic device based on the first and second characteristics.

30 Claims, 12 Drawing Sheets

(51) Int. Cl.
    *G10L 15/22*     (2006.01)
    *G10L 25/48*     (2013.01)
    *G06F 3/16*     (2006.01)
    G10L 25/18     (2013.01)
    G10L 25/21     (2013.01)

(56) References Cited

U.S. PATENT DOCUMENTS

| | | | |
|---|---|---|---|
| 8,213,633 B2 | 7/2012 | Kobayashi et al. | |
| 8,705,759 B2 | 4/2014 | Wolff et al. | |
| 9,251,787 B1 * | 2/2016 | Hart | G10L 15/22 |
| 9,525,938 B2 * | 12/2016 | Deshpande | H04R 3/005 |
| 2003/0009329 A1 | 1/2003 | Stahl et al. | |
| 2006/0198529 A1 * | 9/2006 | Kjems | H04R 25/407 |
| | | | 381/26 |
| 2011/0188681 A1 * | 8/2011 | Kramer | H04R 29/006 |
| | | | 381/313 |
| 2011/0293103 A1 * | 12/2011 | Park | G10K 11/1782 |
| | | | 381/57 |
| 2013/0010980 A1 * | 1/2013 | Yoshioka | G01S 3/802 |
| | | | 381/92 |
| 2013/0204629 A1 | 8/2013 | Nakanishi | |
| 2015/0289065 A1 * | 10/2015 | Jensen | H04R 25/552 |
| | | | 381/315 |

FOREIGN PATENT DOCUMENTS

| | | |
|---|---|---|
| EP | 2911149 A1 | 8/2015 |
| WO | 2013133533 A1 | 9/2013 |
| WO | 2014087495 A1 | 6/2014 |

\* cited by examiner

CONTROLLING ELECTRONIC DEVICE BASED ON DIRECTION OF SPEECH

FIELD OF THE DISCLOSURE

The present disclosure relates generally to controlling electronic devices, and more specifically, to controlling electronic devices in response to a voice command.

DESCRIPTION OF RELATED ART

Recently, the use of electronic devices such as smartphones, tablet computers, smart TVs, and the like has become widespread. These devices often provide voice and/or data communication functionalities over wireless or wired networks. In addition, such devices may provide a variety of functions designed to enhance user convenience such as sound processing, image or video processing, navigation, reproduction of music or multimedia files, etc.

Among such functions, conventional electronic devices are often equipped with a speech recognition function. Such electronic devices may perform a function in response to receiving and recognizing a voice command from a user. For example, an electronic device equipped with a speech recognition function may activate an application, play an audio file, or take a picture in response to a voice command from a user.

Due to the widespread use of electronic devices, users often have access to a plurality of electronic devices equipped with a speech recognition function that are located near each other. For example, a user may be in a living room in which his or her smartphone, tablet computer, and smart TV are located. In such a case, if the user speaks a voice command toward the smartphone as the intended target, the tablet computer and smart TV as well as the smartphone may receive and respond to the voice command. Thus, such electronic devices may not be able to accurately determine whether they are the intended target of a voice command for responding to the voice command.

SUMMARY OF THE INVENTION

The present disclosure provides methods and apparatus for controlling an electronic device in response to speech spoken by a user.

According to one aspect of the present disclosure, a method for controlling an electronic device in response to speech spoken by a user is disclosed. The method may include receiving an input sound by a sound sensor. The method may also detect the speech spoken by the user in the input sound, determine first characteristics of a first frequency range and second characteristics of a second frequency range of the speech in response to detecting the speech in the input sound, and determine whether a direction of departure of the speech spoken by the user is toward the electronic device based on the first and second characteristics. This disclosure also describes a device relating to this method.

According to another aspect of the present disclosure, an electronic device may include a sound sensor, a speech detector, a frequency analyzing unit, and a speech direction determining unit. The sound sensor may be configured to receive an input sound. Further, the speech detector may be configured to detect speech spoken by a user in the input sound. In addition, the frequency analyzing unit may be configured to determine first characteristics of a first frequency range and second characteristics of a second frequency range of the speech in response to detecting the speech in the input sound, and the speech direction determining unit may be configured to determine whether a direction of departure of the speech spoken by the user is toward the electronic device based on the first and second characteristics.

BRIEF DESCRIPTION OF THE DRAWINGS

Embodiments of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
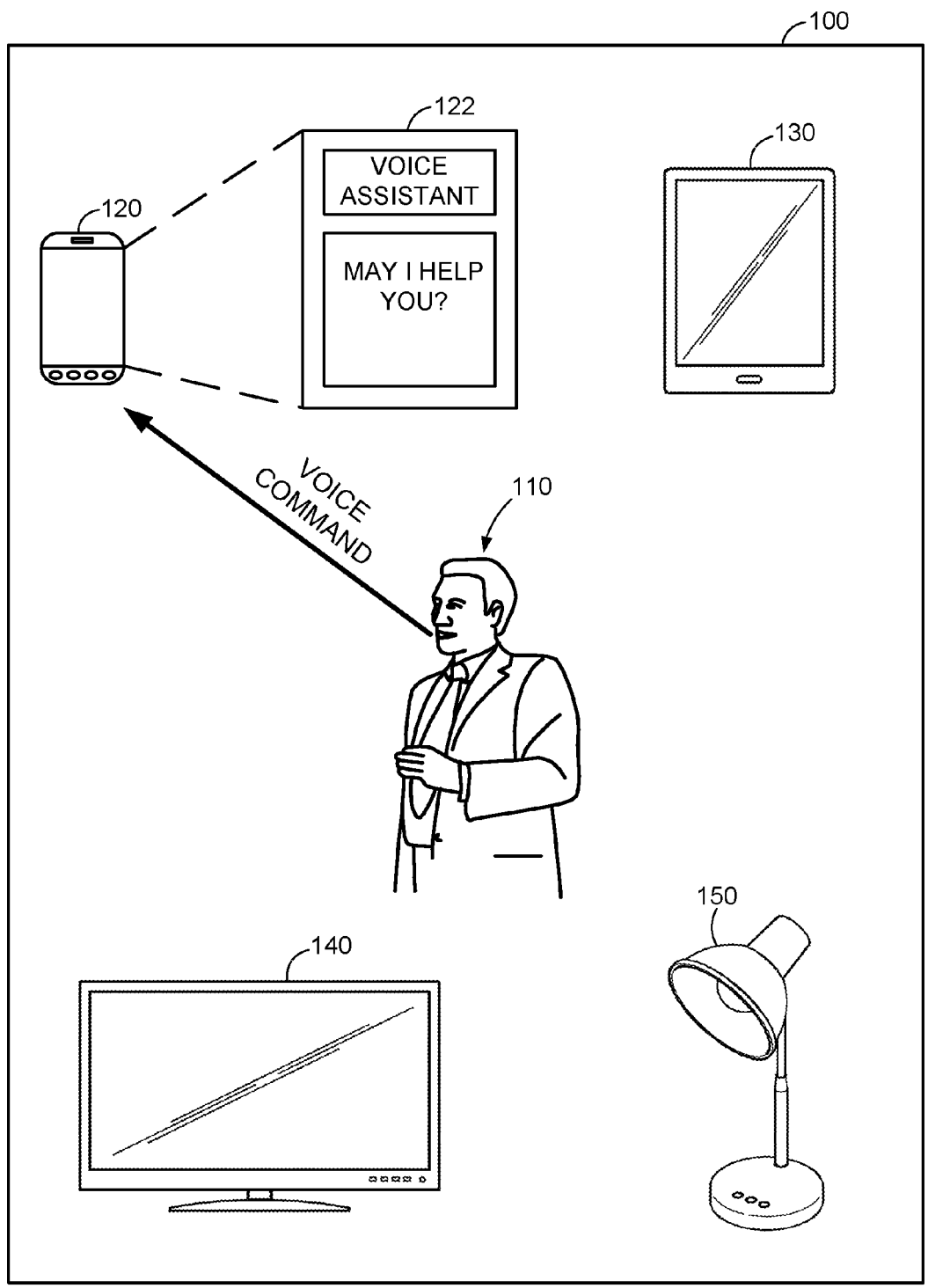
FIG. 1 illustrates electronic devices configured to detect speech spoken by a user and perform a function based on a direction of departure of the speech, according to one embodiment of the present disclosure.

FIG. 1 illustrates electronic devices 120 to 150 configured to detect speech spoken by a user 110 and perform a function based on a direction of departure of the speech, according to one embodiment of the present disclosure. The electronic devices 120 to 150 may be any suitable device equipped with sound capturing and processing capabilities such as a cellular phone, a smartphone, a laptop computer, a wearable computer, a tablet computer, a gaming device, a multimedia player, a smart TV, a voice-controlled lighting device, etc. In the illustrated embodiment, the electronic devices 120 to 150 are a smartphone, a tablet computer, a smart TV, and a voice-controlled lighting device, respectively, and may be located in a room 100. Although the electronic devices 120 to 150 are shown in the room 100, any number of electronic devices may be located in the room 100 or any other suitable location in proximity to the user 110.

The user 110 may speak a voice command in a direction toward one of the electronic devices 120 to 150 as a target device to control operation of the target device. As used herein, the phrase "a direction of departure toward an electronic device" or any variation thereof may refer to a direction along a line between a sound source (e.g., a user) and the electronic device, and may include any directions that deviate from the line within a specified angle or range. In the illustrated embodiment, the user 110 may speak a voice command (e.g., "HI ASSISTANT") in a direction toward the electronic device 120 to activate the electronic device 120 or instruct the electronic device 120 to perform a function (e.g., a voice assistant application 122). As used herein, the term "voice command" may refer to any speech or utterance including one or more words or sound that is indicative of a command or instruction to perform or activate a function or an application in the electronic devices 120 to 150.

In response to a voice command, the electronic devices 120 to 150 may perform a function or execute an application associated with the voice command based on a direction of departure of the voice command from the user 110. For example, the electronic device 120 may activate the voice assistant application 122 upon determining that the direction of departure of the voice command "HI ASSISTANT" is toward itself. Based on a direction of departure of speech from a user, an electronic device may determine whether the speech spoken by the user is in a direction toward itself, as will be shown in more detail below.

The electronic devices 120 to 150 may be configured to continuously, periodically, or intermittently receive an input sound via a sound sensor (e.g., microphone) and detect speech in the input sound. In the illustrated embodiment, the user 110 may speak a voice command (e.g., "HI ASSISTANT") toward the electronic device 120 to activate a voice assistant application 122 of the electronic device 120. The user's speech including the voice command may be received by the electronic devices 120 to 150 as an input sound. As the user's speech is being received as an input sound, the electronic devices 120 to 150 may detect the speech in the input sound.

Once the speech is detected in the input sound, each of the electronic devices 120 to 150 may determine whether a direction of departure of the speech (i.e., spoken direction of the speech) from the user 110 is toward itself. As used herein, the phrase "determining whether a direction of departure of speech is toward itself" or any variation thereof may refer to determining whether a spoken direction of the speech is toward an electronic device, and may encompass either positive test (i.e., determining whether a spoken direction of the speech is toward an electronic device) or negative test (i.e., determining whether a spoken direction of the speech is not toward an electronic device). Among the electronic devices 120 to 150, the electronic device 120 may determine that the direction of departure of the speech is toward itself and proceed to activate the voice assistant application 122 by recognizing the voice command (e.g., "HI ASSISTANT") in the speech. Each of the other electronic devices 130 to 150 may determine that the direction of departure of the speech is not toward itself so that the voice command is not processed.

For determining whether a direction of departure of speech is toward itself, each of the electronic devices 120 to 150 may analyze characteristics of the speech received from the user 110. In one embodiment, each of the electronic devices 120 to 150 may determine first characteristics of a first frequency range (e.g., first frequency band) and second characteristics of a second frequency range (e.g., second frequency band) of the speech, and determine whether the direction of departure of the speech is toward itself based on the first and second characteristics. For example, the first frequency range may be higher than the second frequency range and the first and second frequency ranges may include at least one frequency.

According to one embodiment, the first and second characteristics may be values or parameters such as energy values, spectral moments (for example, mean, variance, skewness, and kurtosis), spectral flatness, spectral centroid, crest factor, spectral slope, spectral roll-off, F0 contour, etc. that may characterize the associated frequency range in the speech received from the user 110. For example, each of the electronic devices 120 to 150 may calculate a ratio between the first and second characteristics and determine that the direction of departure of the speech is toward itself based on the ratio. Alternatively or additionally, the electronic devices 120 to 150 may determine a spectral flatness value based on the first and second characteristics and determine that the direction of departure of the speech is toward itself based on the spectral flatness value. The calculated ratio or the spectral flatness value may be indicative of a probability that the direction of departure of the speech is toward itself.

In a particular embodiment, each of the electronic devices 120 to 150 may calculate a ratio between an energy value of a high frequency range and an energy value of a low frequency range of the speech, and determine that a direction of departure of the speech is toward itself when the ratio is greater than or equal to a threshold value, which may be a predetermined threshold value. Alternatively or additionally, each of the electronic devices 120 to 150 may determine a spectral flatness value of a high frequency range of the speech according to the following equation:

$$\text{FLATNESS} = \frac{\sqrt[n]{\prod_1^n E_{Hi}/E_L}}{\frac{1}{n}\sum_1^n E_{Hi}/E_L} \quad \text{(Equation 1)}$$

where $E_L$ represents an energy value of a low frequency range, $H_1$ to $H_n$ represent n portions of the high frequency range (e.g., the high frequency range may be divided into three different portions when n=3), and $E_{H1}$ to $EH_n$ represent energy values of the n portions of the high frequency range, respectively. In this case, each of the electronic devices 120 to 150 may determine that a direction of departure of the speech is toward itself when the spectral flatness value is less than or equal to a threshold value, which may be a predetermined threshold value.

Since a low frequency signal or sound tends to propagate in all directions while a high frequency signal or sound is more directional in propagating mainly in a departure direction of the signal or sound, each of the electronic devices 120 to 150 may use the ratio between the energy value of the high frequency range and the energy value of the low frequency range or the spectral flatness value of the high frequency range to determine whether the direction of departure of the speech is toward itself. In the illustrated embodiment, the electronic device 120 may determine that the spoken direction of the speech is toward itself, and perform speech recognition on the speech to recognize a voice command (e.g., "HI ASSISTANT") in the speech. Once the voice command is recognized, the electronic device 120 may activate the voice assistant application 122 associate with the voice command (e.g., "HI ASSISTANT").

In some embodiments, the electronic devices 120 to 150 may be configured to communicate with each other via a wired or wireless network (not shown). In this case, each of the electronic devices 120 to 150 may detect the speech spoken by the user 110 and calculate a ratio between the first and second characteristics (e.g., energy values) of the speech or a spectral flatness value of a high frequency range of the speech. The calculated ratio or the spectral flatness value may then be sent to the other electronic devices. Upon comparing the ratios or the spectral flatness values of the electronic devices 120 to 150, one of the electronic devices 120 to 150 that has the highest ratio or the lowest spectral flatness value may determine that it is the intended target device for the speech. In response, the target electronic device may proceed to recognize the voice command in the speech and perform a function associated with the voice command.

Figure 2:
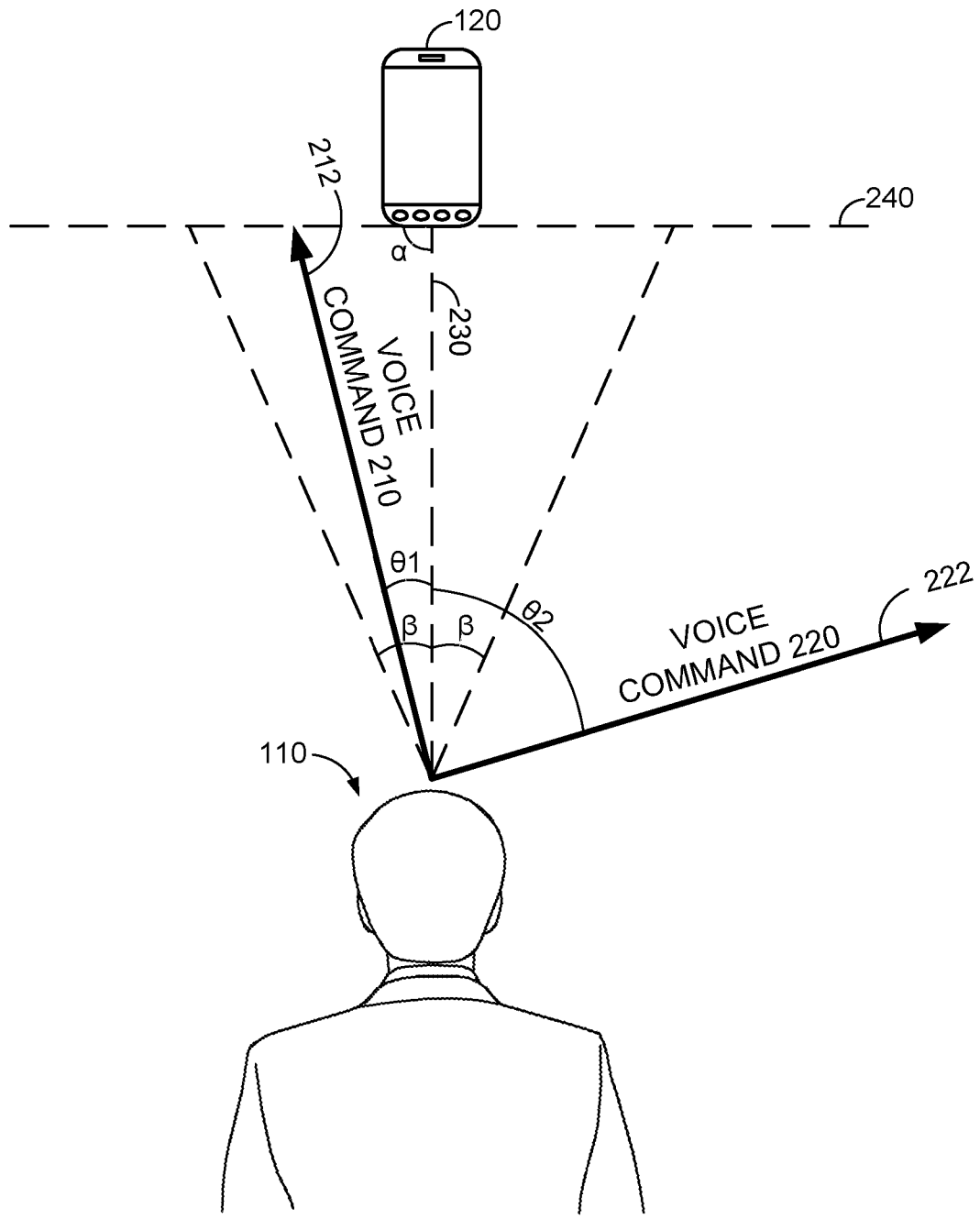
FIG. 2 illustrates directions of departure for voice commands, which are spoken by a user and received by a sound sensor in an electronic device, according to one embodiment of the present disclosure.

FIG. 2 illustrates directions of departure 212 and 222 for voice commands 210 and 220, respectively, which are spoken by the user 110 and received by a sound sensor in the electronic device 120, according to one embodiment of the present disclosure. The user 110 may speak voice commands 210 and 220 in different directions at different times and the voice commands 210 and 220 may be detected as speech by the electronic device 120. As shown, the direction of departure 212 of the voice command 210 from the user 110 may be toward the electronic device 120 while the direction of departure 222 of the voice command 220 may be in another direction away from the electronic device 120.

The electronic device 120 may be configured to determine that a direction of departure of speech is toward itself when the direction is determined to be within a specified angle or range from a line between the electronic device 120 and the user 110. In the illustrated embodiment, the specified angle or range may be β degrees from a reference line 230 between the user 110 and the electronic device 120. If an angle between a direction of departure of speech and the reference line 230 is less than or equal to β degrees, the electronic device 120 may determine that the direction of departure of the speech is toward itself. For example, the electronic device 120 may detect the voice command 210 as speech and determine that the angle $\theta_1$ between the direction of departure 212 of the speech and the reference line 230 is less than β degrees. In this case, the electronic device 120 may determine that the direction of departure 212 of the speech is toward itself and recognize the voice command 210 in the speech to perform a function associated with the voice command 210.

On the other hand, the electronic device 120 may detect the voice command 220 as speech and determine that the angle $\theta_2$ between the direction of departure 222 of the speech and the reference line 230 is greater than β degrees. In this case, the electronic device 120 may determine that the direction of departure 222 of the speech is not toward itself so that the voice command 220 is not processed. Thus, based on a direction of departure (DOD) of speech from the user 110, the electronic device 120 may determine whether the speech is spoken in a direction toward the electronic device even when the user 110 speaks in different directions in a same location. In one embodiment, the electronic device 120 may determine a direction of departure of speech by using a single sound sensor (e.g., microphone) or any number of sound sensors.

As used herein, a direction of departure of speech is different from "a direction of arrival" (DOA), which refers to an arrival angle of speech spoken by a user. If a direction of arrival (DOA) were to be used, the electronic device 120 may determine that the direction of arrival of the voice command 210 in the electronic device 120 is a direction defined by the reference line 230. Similarly, the electronic device 120 may determine that the direction of arrival of the voice command 220 in the electronic device 120 is a direction defined by the reference line 230, even when the voice command 220 is spoken in a direction away from the electronic device 120. In both cases, the direction of arrival 230 of the voice commands 210 and 220 in the electronic device 120 is a degrees away from a reference line 240, which may be defined as a line between a pair of sound sensors (e.g., a pair of microphones). Since the directions of arrival 230 are determined to be the same for the voice commands 210 and 220 that are spoken in different directions, the electronic device 120 may use a direction of arrival (DOA) for determining in which direction the source of sound is located with reference to the reference line 240 and use a direction of departure for determining whether speech is spoken in a direction toward the electronic device 120. Although the electronic device 120 is shown in FIG. 2, any other electronic device such as electronic device 130, 140, or 150 may be configured to determine whether speech from a user (e.g., the user 110) is spoken in a direction toward itself in a similar manner as the electronic device 120.

Figure 3:
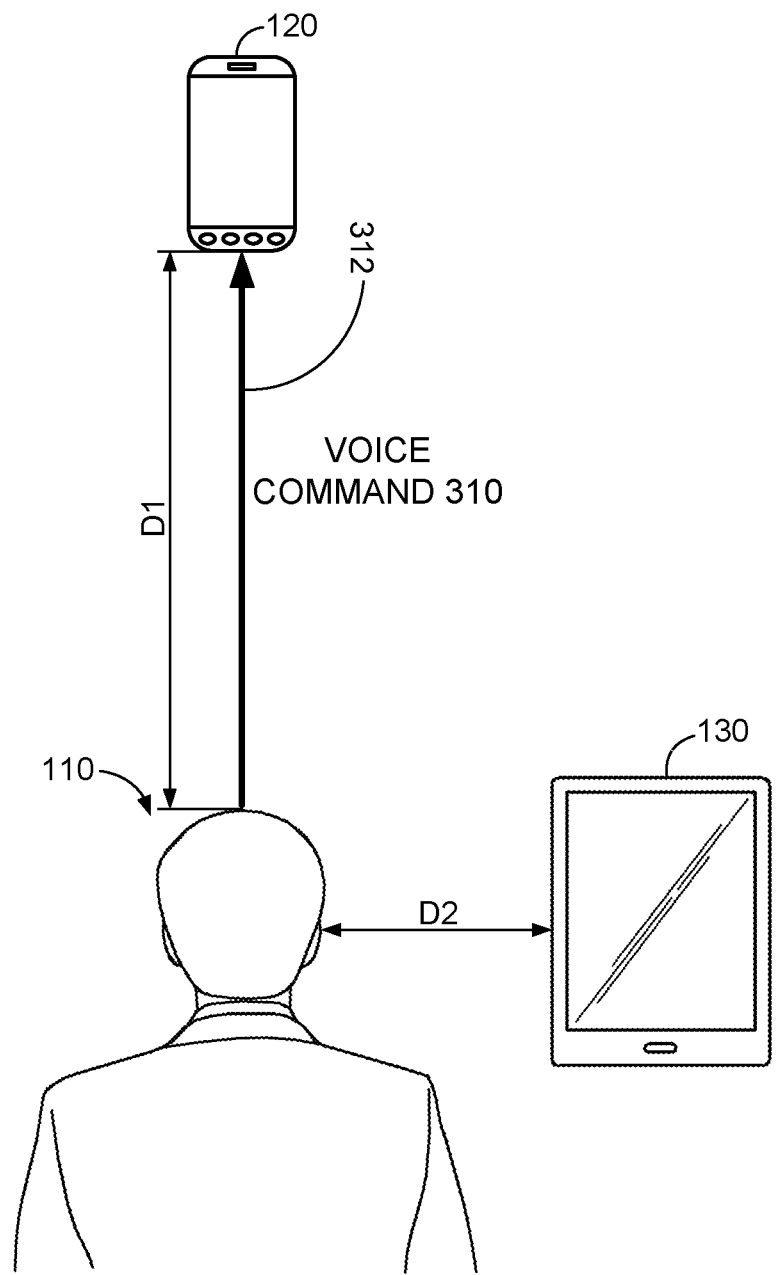
FIG. 3 illustrates a voice command spoken by a user in a direction of departure and received by one or more sound sensors in each of electronic devices, according to one embodiment of the present disclosure.

FIG. 3 illustrates a voice command 310 spoken by the user 110 in a direction of departure 312 and received by one or more sound sensors in each of the electronic devices 120 and 130, according to one embodiment of the present disclosure. The user 110 may be located near the electronic devices 120 and 130, and speak the voice command 310 toward the electronic device 120. As shown, a distance D1 between the user 110 and the electronic device 120 may be greater than a distance D2 between the user 110 and the electronic device 130.

In one embodiment, each of the electronic devices 120 and 130 may detect the voice command 310 as speech and calculate a ratio between first characteristics of a first frequency range (e.g., an energy value of a high frequency band) and second characteristics of a second frequency range (e.g., an energy value of a low frequency band) of the speech. Alternatively or additionally, each of the electronic devices 120 and 130 may determine a spectral flatness value of a high frequency range of the speech based on first characteristics of a first frequency range (e.g., energy values of a high frequency band) and second characteristics of a second frequency range (e.g., an energy value of a low frequency band) of the speech. Based on the calculated ratio or the spectral flatness value, each of the electronic devices 120 and 130 may determine whether the direction of departure 312 of the voice command 310 is toward itself. Since a signal intensity of speech received by the electronic device 120 or 130 may vary depending on a distance (e.g., D1 or D2) from the user 110, the electronic device 120 or 130 may use the ratio between the first characteristics and the second characteristics of the speech or the spectral flatness value of the high frequency range of the speech as a normalized value which is independent of a distance from the user 110. Accordingly, the ratio or the spectral flatness value calculated by the electronic device 120 or 130 may be independent of a signal intensity of input sound received from the user 110.

According to the illustrated embodiment, each of the electronic devices 120 and 130 may detect the voice command 310 as speech and determine whether the direction of departure 312 of the speech is toward itself independent of the distance D1 or D2 from the sound source (e.g., the user 110). For example, the electronic device 120 may detect the voice command 310 as speech and determine that the direction of departure 312 of the speech is toward itself based on a ratio between energy values of high and low frequency bands of the speech or a spectral flatness value of a high frequency band. In one embodiment, the electronic device 120 may determine that the direction of departure 312 of the speech is toward itself when the ratio is greater than or equal to a threshold value or when the spectral flatness value is less than or equal to a threshold value. Upon determining that the direction of departure 312 of the speech is toward itself, the electronic device 120 may recognize the voice command 310 in the speech and perform a function associated with the voice command 310.

On the other hand, the electronic device 130, which is located closer to the user 110 than the electronic device 120, may detect the voice command 310 as speech and determine that the direction of departure 312 of the speech is not toward itself based on a ratio between energy values of high and low frequency bands of the speech or a spectral flatness value of a high frequency band. Although the sound intensity of speech received by the electronic device 130 may be greater than that of the electronic device 120 since the distance D1 is greater than the distance D2, the electronic device 130 may determine that the direction of departure 312 of the speech is not toward itself based on the ratio or the spectral flatness value so that the voice command 310 is not processed.

Figure 4:
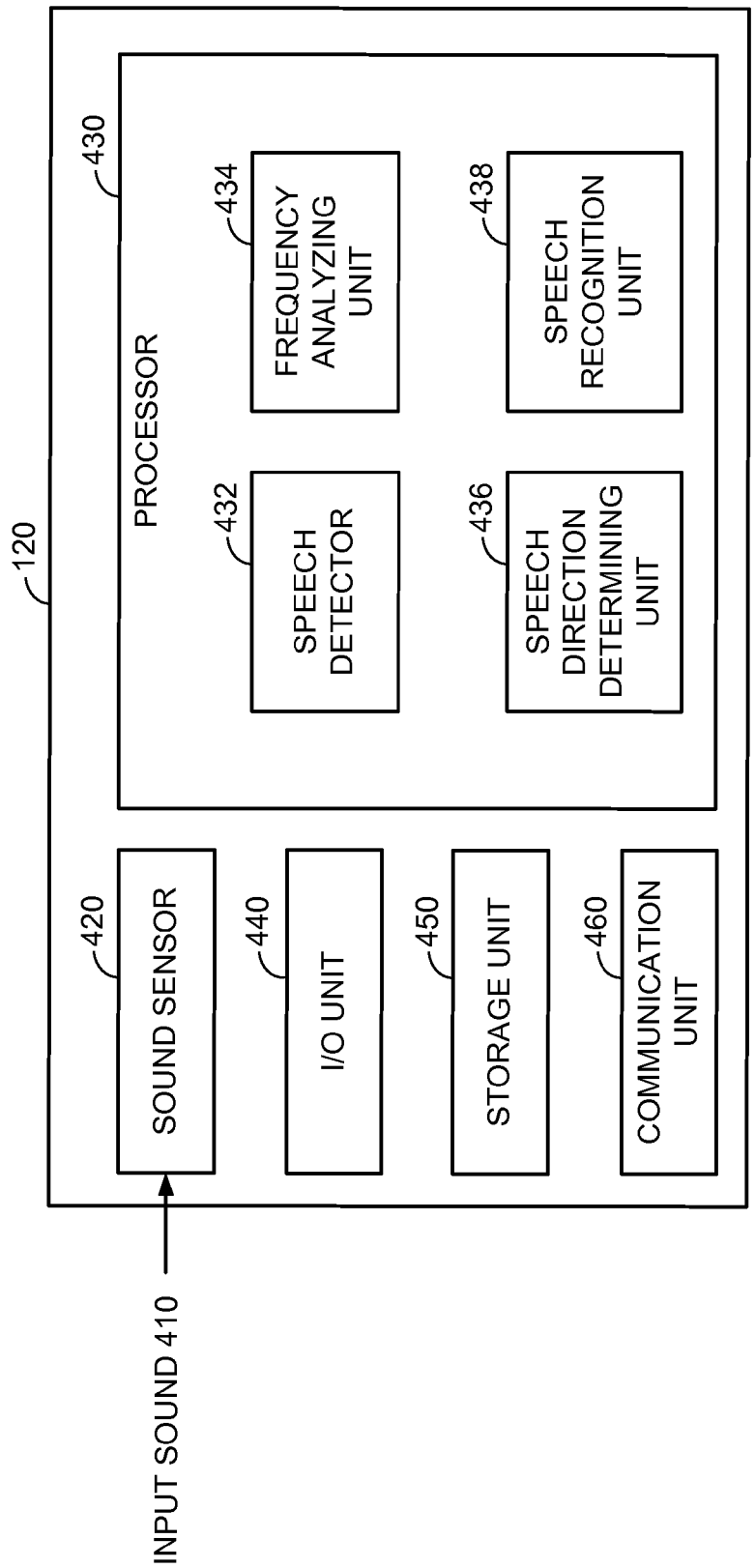
FIG. 4 illustrates a block diagram of an electronic device configured to determine whether a direction of departure of speech is toward itself and perform a function associated with a voice command in the speech, according to one embodiment of the present disclosure.

FIG. 4 illustrates a block diagram of the electronic device 120 configured to determine whether a direction of departure of speech is toward itself and perform a function associated with a voice command in the speech, according to one embodiment of the present disclosure. The electronic device 120 may include a sound sensor 420, a processor 430, an I/O unit 440, a storage unit 450, and a communication unit 460. As shown, the processor 430 may include a speech detector 432, a frequency analyzing unit 434, a speech direction determining unit 436, and a speech recognition unit 438. The processor 430 may be any suitable processor for managing and operating the electronic device 120, such as an application processor (AP), central processing unit (CPU), digital signal processor (DSP), etc. The electronic device 120 may be any suitable device equipped with sound capturing and processing capabilities such as a cellular phone, a smartphone, a laptop computer, a wearable computer, a tablet computer, a gaming device, a multimedia player, a smart TV, a voice-controlled lighting device, etc.

The sound sensor 420 may be configured to continuously, periodically, or intermittently receive an input sound 410 and provide the received input sound 410 to the speech detector 432. For example, the sound sensor 420 may receive at least a portion of speech including a voice command from a user as the input sound 410 and provide the input sound 410 to the speech detector 432. The sound sensor 420 may include one or more microphones or any other types of sound sensors that can be used to receive, capture, sense, and/or detect the input sound 410. In addition, the sound sensor 420 may employ any suitable software and/or hardware for performing such functions.

In some embodiments, the sound sensor 420 may be configured to periodically receive the input sound 410 according to a duty cycle to reduce power consumption. For example, the sound sensor 420 may be activated periodically on a 10% duty cycle. Given a period of 100 ms, the sound sensor 420 may thus be configured to operate in an "active state" for 10 ms and in an "idle state" for the next 90 ms.

In this case, when a portion of the input sound 410 is received during an active portion of the duty cycle, the sound sensor 420 may determine whether the portion of the input sound 410 is greater than a threshold sound intensity. In a particular embodiment, the threshold sound intensity may be a predetermined threshold sound intensity. If the intensity of the portion of the input sound 410 is determined to be greater than the predetermined threshold sound intensity, the sound sensor 420 may activate the speech detector 432 in the processor 430 and provide the portion of the input sound 410 to the speech detector 432. Alternatively, without determining whether the received portion exceeds a threshold sound intensity, the sound sensor 420 may receive the portion of the input sound 410 periodically during an active state of the duty cycle and automatically activate the speech detector 432 to provide the received portion to the speech detector 432. In another embodiment, the sound sensor 420 may continuously receive the input sound 410 and activate the speech detector 432 to provide the received input sound 410 to the speech detector 432.

Upon being activated, the speech detector 432 in the processor 330 may receive at least the portion of the input sound 410 from the sound sensor 420. The speech detector 432 may then extract a plurality of sound features from at least the portion of the input sound 410 and determine whether the extracted sound features are indicative of a sound of interest such as speech by using any suitable sound classification methods such as a Gaussian mixture model (GMM) based classifier, a neural network, a Hidden Markov model (HMM), a graphical model, a Support Vector Machine (SVM), and the like. If at least the portion of the input sound 410 is determined to be a sound of interest (e.g., speech), the speech detector 432 may receive a remaining portion of the input sound 410 via the sound sensor 420. In addition, the speech detector 432 may activate the frequency analyzing unit 434 and provide the input sound 410 to the frequency analyzing unit 434.

The frequency analyzing unit 434 may be configured to analyze characteristics of the speech received from the user as the input sound 410. In one embodiment, the frequency analyzing unit 434 may determine first characteristics of a first frequency range (e.g., first frequency band) and second characteristics of a second frequency range (e.g., second frequency band) of the speech (i.e., input sound 410). For example, the first frequency range may be higher than the second frequency range and the first and second frequency ranges may include at least one frequency.

According to one embodiment, the first and second characteristics may be values or parameters such as energy values, spectral moments (for example, mean, variance, skewness, and kurtosis), spectral flatness, spectral centroid, crest factor, spectral slope, spectral roll-off, F0 contour, etc. that may characterize the associated frequency range in the speech received from the user. In a particular embodiment, the frequency analyzing unit 434 may calculate a ratio between the first and second characteristics. For example, the frequency analyzing unit 434 may convert the input sound 410 from the time domain into the frequency domain or the time-frequency domain, and calculate a ratio between an energy value of a high frequency range (e.g., 10 kHz to 15 kHz) and an energy value of a low frequency range (e.g., 0 kHZ to 5 kHz). Alternatively or additionally, the frequency analyzing unit 434 may calculate a spectral flatness value of a high frequency range of the speech using Equation 1 above. The frequency analyzing unit 434 may provide the calculated ratio or the spectral flatness value to the speech direction determining unit 436. The ratio or the spectral flatness value may be indicative of a probability that the direction of departure of the user's speech is toward the electronic device 120.

Upon receiving the ratio or the spectral flatness value, the speech direction determining unit 436 may determine whether a direction of departure of the speech is toward itself based on the ratio or the spectral flatness value. In one embodiment, the speech direction determining unit 436 may determine that a direction of departure of the speech is toward the electronic device 120 when the ratio is greater than or equal to a threshold value or when the spectral flatness value is less than or equal to a threshold value. In a particular embodiment, the threshold value may be a predetermined threshold value. Since a low frequency signal or sound tends to propagate in all directions while a high frequency signal or sound is more directional in propagating mainly in a departure direction of the signal or sound, the frequency analyzing unit 434 may use the ratio between the energy value of the high frequency range and the energy value of the low frequency range or the spectral flatness value of the high frequency range to determine whether the direction of departure of the speech is toward the electronic device.

In response to determining that that the direction of departure of the user's speech is toward the electronic device 120, the input sound 410 may be provided to the speech recognition unit 438 to perform speech recognition on the speech. The speech recognition unit 438 may then recognize the voice command in the speech (i.e., input sound 410). In one embodiment, the speech recognition unit 438 may access language models, acoustic models, grammar models, or the like from the storage unit 450 for use in recognizing speech and/or voice commands of one or more users. The storage unit 450 may be remote or local storage, and may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive). Once the voice command is recognized, the processor 430 may perform a function associate with the voice command and show the result thereof to the user via the I/O unit 440. Although the electronic device 120 is shown in FIG. 4, any other electronic device such as electronic device 130, 140, or 150 may be configured to determine whether speech from a user is spoken in a direction toward itself in a similar manner as the electronic device 120.

In some embodiments, the electronic device 120 may be configured to communicate with an external device (e.g., the electronic devices 120 to 150 in FIG. 1 or a server) via the communication unit 460. In this case, the electronic device 120 may send the calculated ratio or the spectral flatness value to the external device via the communication unit 460. The electronic device 120 may also receive a ratio or a spectral flatness value from the external device as an indication of a spoken direction of the speech via the communication unit 460. Upon comparing the ratios or the spectral flatness values, the speech direction determining unit 436 may determine that the electronic device 120 is the intended target device for the speech if the electronic device 120 has the highest ratio or the lowest spectral flatness value. If it is determined that the electronic device 120 has the highest ratio or the lowest spectral flatness value, the speech recognition unit 438 may recognize the voice command in the speech (i.e., input sound 410) to perform a function associated with the voice command.

Alternatively or additionally, the electronic device 120 may receive a message from the external device (e.g., a server) indicating that it is the intended target device for the voice command. Upon receiving the message, the speech recognition unit 438 may recognize the voice command in the speech (i.e., input sound 410). The processor 430 may then perform a function associated with the recognized voice command.

Figure 5:
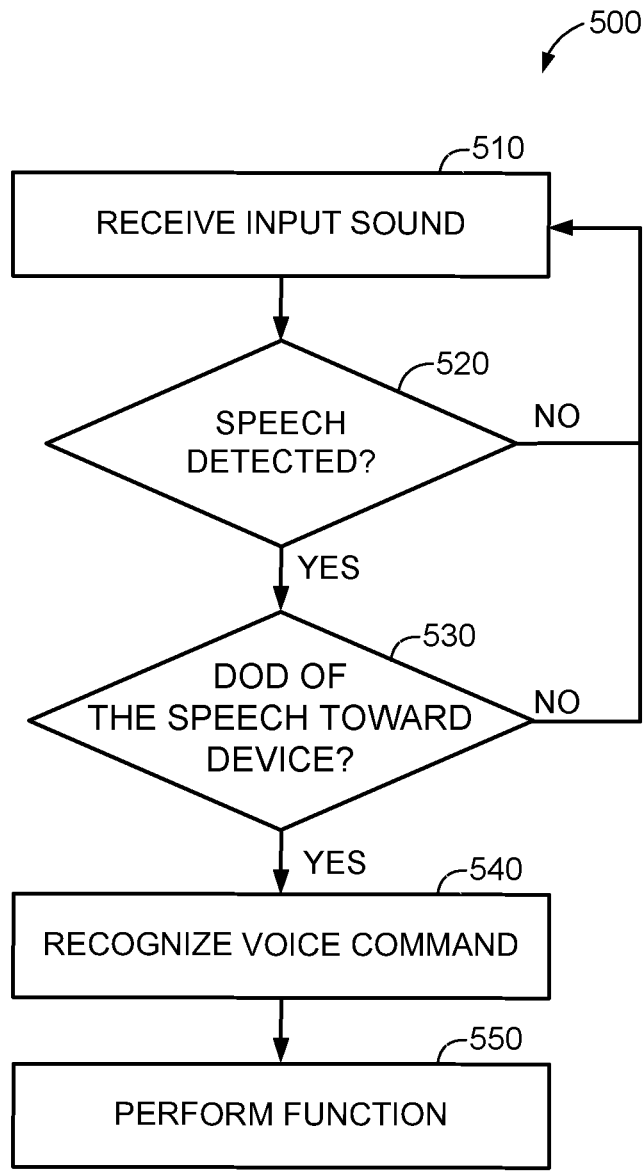
FIG. 5 illustrates a flowchart of an exemplary method for controlling an electronic device in response to speech spoken by a user, according to one embodiment of the present disclosure.

FIG. 5 illustrates a flowchart of an exemplary method 500 for controlling an electronic device in response to speech spoken by a user, according to one embodiment of the present disclosure. Initially, the electronic device (e.g., one of the electronic devices 120 to 150 in FIG. 1) may receive speech including a voice command as an input sound via a sound sensor (e.g., a microphone) at 510. At 520, the electronic device may determine whether speech is detected in the received input sound. The electronic device may detect speech by using any methods such as a Gaussian mixture model (GMM) based classifier, a neural network, a Hidden Markov model (HMM), a graphical model, a Support Vector Machine (SVM), and the like. If speech is not detected (i.e., NO at 520), the method 500 may proceed back to 510 and receive another input sound via the sound sensor.

When speech is detected in the received input sound (i.e., YES at 520), the electronic device may determine a direction of departure (DOD) of the speech and determine whether the direction of departure (DOD) of the speech is toward itself at 530. If the electronic device determines that the direction of departure (DOD) of the speech is not toward itself (i.e., NO at 530), the method 500 may proceed back to 510 and receive another input sound via the sound sensor. On the other hand, if the electronic device determines that the direction of departure (DOD) of the speech is toward itself (i.e., YES at 530), the electronic device may recognize the voice command in the speech at 540. Once the voice command in the speech is recognized, the electronic device may perform a function associated with the voice command at 550. Some embodiments of the present disclosure that determine a ratio between first characteristics of a first frequency range and second characteristics of a second frequency range of a speech are described below with reference to FIGS. 6 to 10. As described above, such embodiments may determine a spectral flatness value of a high frequency range of a speech instead of or in addition to determining a ratio between first characteristics of a first frequency range and second characteristics of a second frequency range of a speech.

Figure 6:
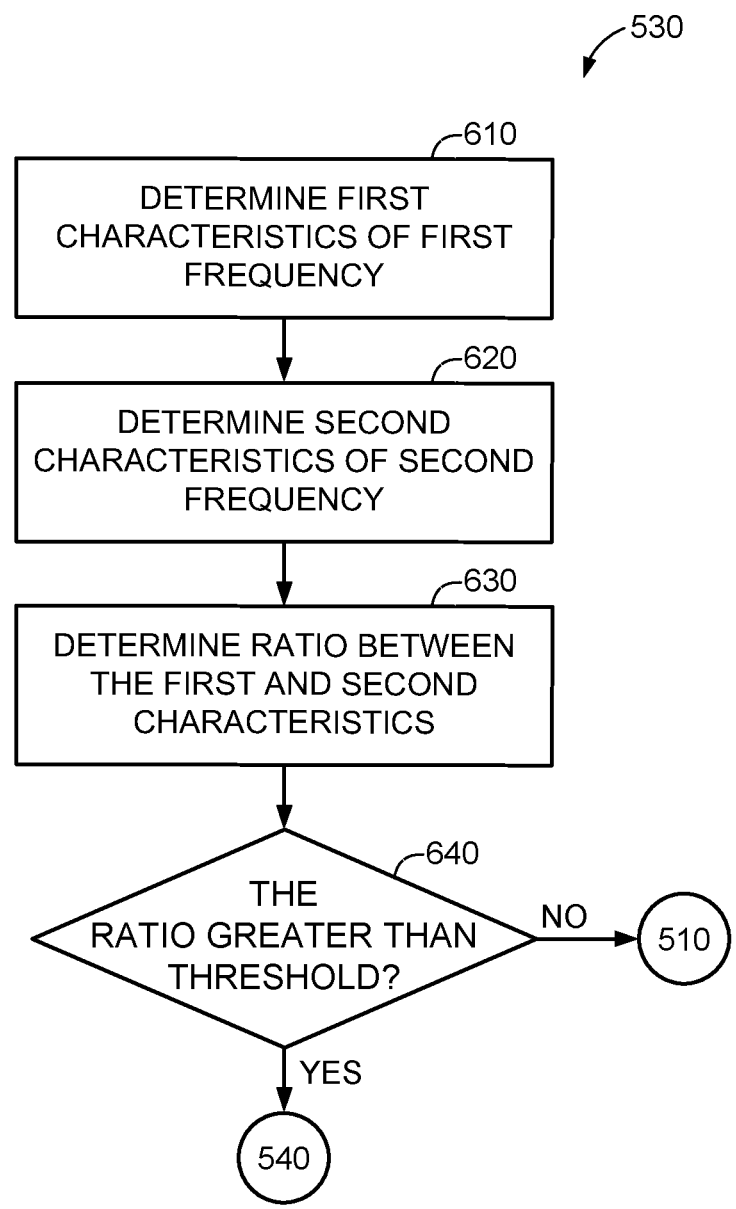
FIG. 6 illustrates a flowchart of an exemplary method performed in an electronic device for determining whether a direction of departure (DOD) of speech received from a user is toward itself, according to one embodiment of the present disclosure.

FIG. 6 illustrates a flowchart of an exemplary method 530 performed in an electronic device for determining whether a direction of departure (DOD) of speech received from a user is toward itself, according to one embodiment of the present disclosure. Initially, the electronic device may determine first characteristics of a first frequency range and second characteristics of a second frequency range of the speech at 610 and 620, respectively. For example, the first frequency range may be higher than the second frequency range and the first and second frequency ranges may include at least one frequency. According to one embodiment, the first and second characteristics may be values or parameters such as energy values, spectral moments (for example, mean, variance, skewness, and kurtosis), spectral flatness, spectral centroid, crest factor, spectral slope, spectral roll-off, F0 contour, etc. that may characterize the associated frequency range in the speech received from the user.

At 630, the electronic device may determine a ratio between the first characteristics of the first frequency range and the second characteristics of the second frequency range of the speech. For example, the electronic device may calculate a ratio between an energy value of a high frequency range and an energy value of a low frequency range of the speech. Upon determining the ratio, the electronic device may determine whether the ratio is greater than or equal to a threshold value, which may be a predetermined value, at 640. In one embodiment, an optimal value for reducing a false alarm and enhancing accuracy of detection may be determined and set as the threshold value.

When the ratio is greater than or equal to the threshold value (i.e., YES at 640), the electronic device may determine that the direction of departure of the speech is toward itself and the method 530 may proceed to the method 540 in FIG. 5 to recognize a voice command in the speech. On the other hand, when the ratio is less than the threshold value (i.e., NO at 640), the electronic device may determine that the direction of departure of the speech is not toward itself and the method 530 may proceed to the method 510 in FIG. 5 to receive another input sound via the sound sensor.

Figure 7:
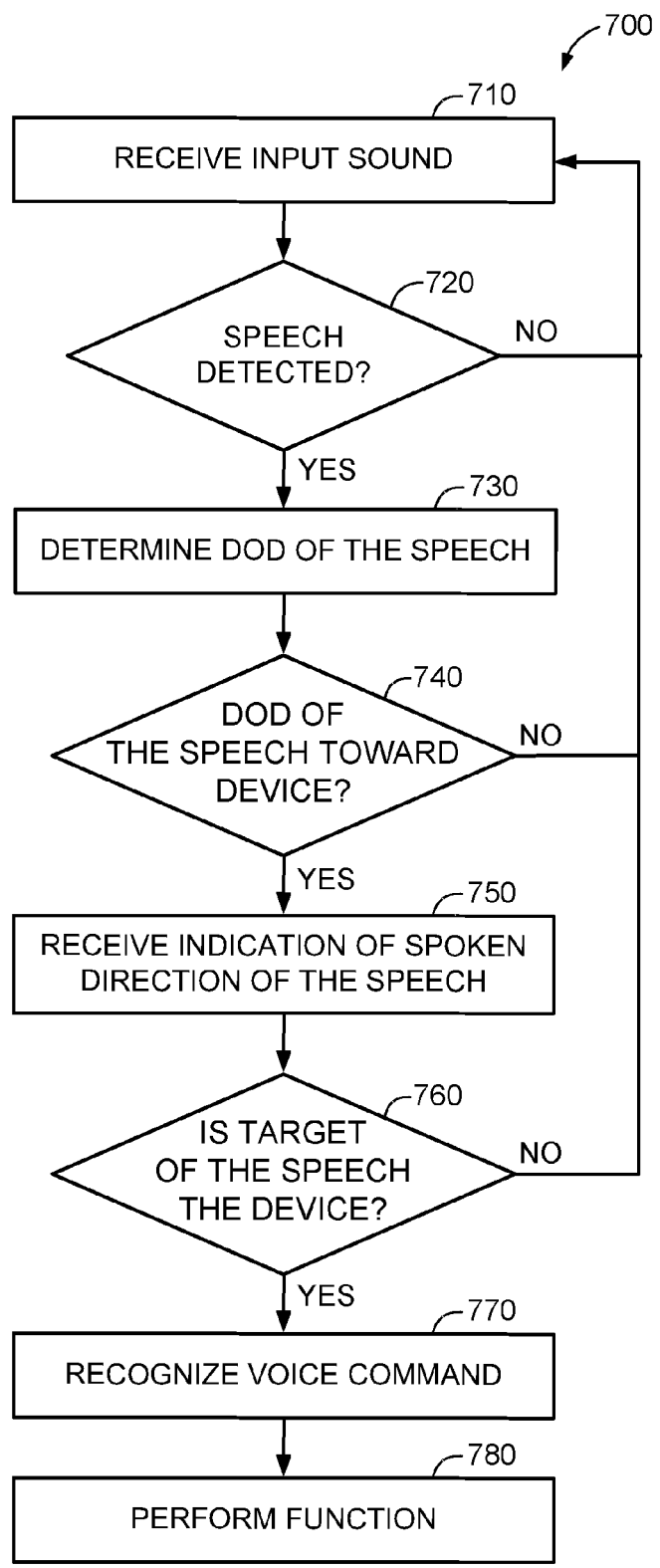
FIG. 7 illustrates a flowchart of an exemplary method for controlling an electronic device in response to speech spoken by a user in connection with other electronic devices, according to one embodiment of the present disclosure.

FIG. 7 illustrates a flowchart of an exemplary method 700 for controlling an electronic device in response to speech spoken by a user in connection with other electronic devices, according to one embodiment of the present disclosure. Initially, the electronic device (e.g., one of the electronic devices 120 to 150 in FIG. 1) may receive speech including a voice command as an input sound via a sound sensor (e.g., a microphone) at 710. At 720, the electronic device may determine whether speech is detected in the received input sound. The electronic device may detect speech by using any methods such as a Gaussian mixture model (GMM) based classifier, a neural network, a Hidden Markov model (HMM), a graphical model, a Support Vector Machine (SVM), and the like. If speech is not detected (i.e., NO at 720), the method 700 may proceed back to 710 to receive another input sound via the sound sensor.

When speech is detected in the received input sound (i.e., YES at 720), the electronic device may determine a direction of departure (DOD) of the speech at 730. In one embodiment, the electronic device may calculate a ratio between an energy value of a high frequency range and an energy value of a low frequency range of the speech. At 740, the electronic device may then determine whether a direction of departure (DOD) of the speech is toward itself at 740. In one embodiment, the electronic device may determine that the direction of departure of the speech is toward itself when the ratio between the energy value of the high frequency range and the energy value of the low frequency range of the speech is greater than or equal to a threshold value, which may be a predetermined value. If the electronic device determines that the direction of departure (DOD) of the speech is not toward itself (i.e., NO at 740), the method 700 may proceed back to 710 to receive another input sound via the sound sensor.

On the other hand, if the electronic device determines that the direction of departure (DOD) of the speech is toward itself (i.e., YES at 740), the electronic device may receive at least one indication of a spoken direction of the speech from external devices at 750. In one embodiment, the indication of the spoken direction of the speech may be a ratio between an energy value of a high frequency range and an energy value of a low frequency range of speech received at an external device. At 760, the electronic device may determine whether it is the intended target of the speech based on the calculated ratio and the at least one indication received from other external devices. For example, the electronic device may compare the calculated ratio with the ratios received from the other devices and determine that it is the target of the speech when the calculated ratio has the highest value.

If the electronic device determines that it is not the intended target of the speech (i.e., NO at 760), the method 700 may proceed back to 710 to receive another input sound via the sound sensor. On the other hand, if the electronic device determines that it is the intended target of the speech (i.e., YES at 760), the electronic device may recognize the voice command in the speech at 770. Once the voice command in the speech is recognized, the electronic device may perform a function associated with the voice command at 780. In another embodiment, the electronic device may omit performing the step of 740. In this case, the electronic device may directly proceed to receive at least one indication of a spoken direction of the speech from external devices at 750 after determining a direction of departure (DOD) of the speech (e.g., calculating a ratio between an energy value of a high frequency range and an energy value of a low frequency range of the speech) at 730.

Figure 8:
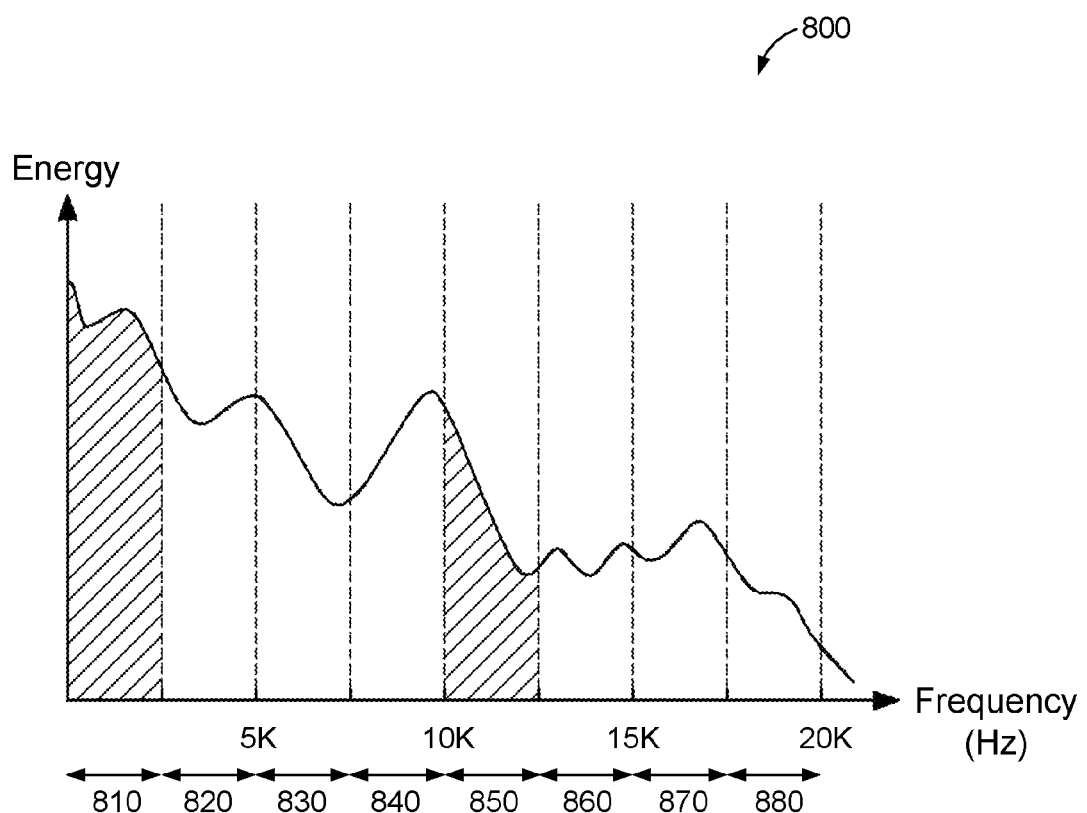
FIG. 8 illustrates an exemplary graph that may be generated by an electronic device by plotting energy values of a received input sound at a specified time as a function of frequency, according to one embodiment of the present disclosure.

FIG. 8 illustrates an exemplary graph 800 that may be generated by an electronic device by plotting energy values of a received input sound at a specified time as a function of frequency, according to one embodiment of the present disclosure. The horizontal axis of the graph 800 may represent a frequency range starting from 0 Hz and the vertical axis may represent a range of energy values of the input sound. For example, a signal intensity of the input sound at a specified frequency may be represented as an energy value. The frequency range in the graph 800 may be divided into a plurality of frequency ranges 810 to 880 (e.g., frequency bands), each having a width of 2.5 kHz. Alternatively, the plurality of frequency ranges 810 to 880 may have different widths.

In one embodiment, the electronic device may receive a user's speech including a voice command at a particular time as an input sound via a sound sensor. The intensities of the received sound associated with a frequency range may then be converted into energy values. The energy values may be plotted in the graph 800 as a function of frequency.

Among the plurality of frequency ranges 810 to 880, the electronic device may select a low frequency range 810 and a high frequency range 850. Although the graph 800 is illustrated with the low and high frequency ranges 810 and 850 that are selected, any number of frequency ranges may be selected for the low frequency range or the high frequency range. An energy value for each of the low frequency range 810 and the high frequency range 850 may be obtained by integrating the energy values within the frequency range. The electronic device may then calculate a ratio between the energy values for the high and low frequency ranges 850 and 810, respectively. Since the ratio is based on the energy values for the high and low frequency ranges 850 and 810, respectively, which may have different directional propagation characteristics, the ratio may be indicative of a probability that a direction of departure of the user's speech is toward the electronic device.

The electronic device may be configured to determine that the direction of departure of the user's speech is toward itself when the ratio is greater than or equal to a threshold value, which may be a predetermined value. In one embodiment, an optimal value for reducing false alarm and enhancing accuracy of detection may be determined and set as the threshold value. For example, the threshold value may be set as 0.5. In this case, the ratio between the energy values of the high and low frequency ranges 850 and 810, respectively, may be determined to be 0.6, as shown in the graph 800. Since the ratio is greater than or equal to the threshold value, the electronic device may determine that the direction of departure of the user's speech is toward itself. On the other hand, if the ratio is determined to be less than the threshold value, the electronic device may determine that the direction of departure of the user's speech is not toward itself.

In another embodiment, the electronic device may receive a user's speech including a voice command for a specified time period as an input sound via the sound sensor. The input sound may be converted from a time domain to a time-frequency domain by using any suitable transformation or function such as the Fourier transform, etc. In this case, the electronic device may generate a three-dimensional graph that plots energy values associated with the received input sound as a function of frequency and time. For example, the three-dimensional graph may include any suitable number of two-dimensional graphs (e.g., the graph 800) along the time axis. An energy value for a low frequency range and an energy value for a high frequency range may be obtained by integrating the energy values within the frequency range during the specified time period. The electronic device may then calculate a ratio between the energy values for the high and low frequency ranges and determine whether the direction of departure of the user's speech is toward itself in a similar manner as described with reference to the graph 800.

Figure 9:
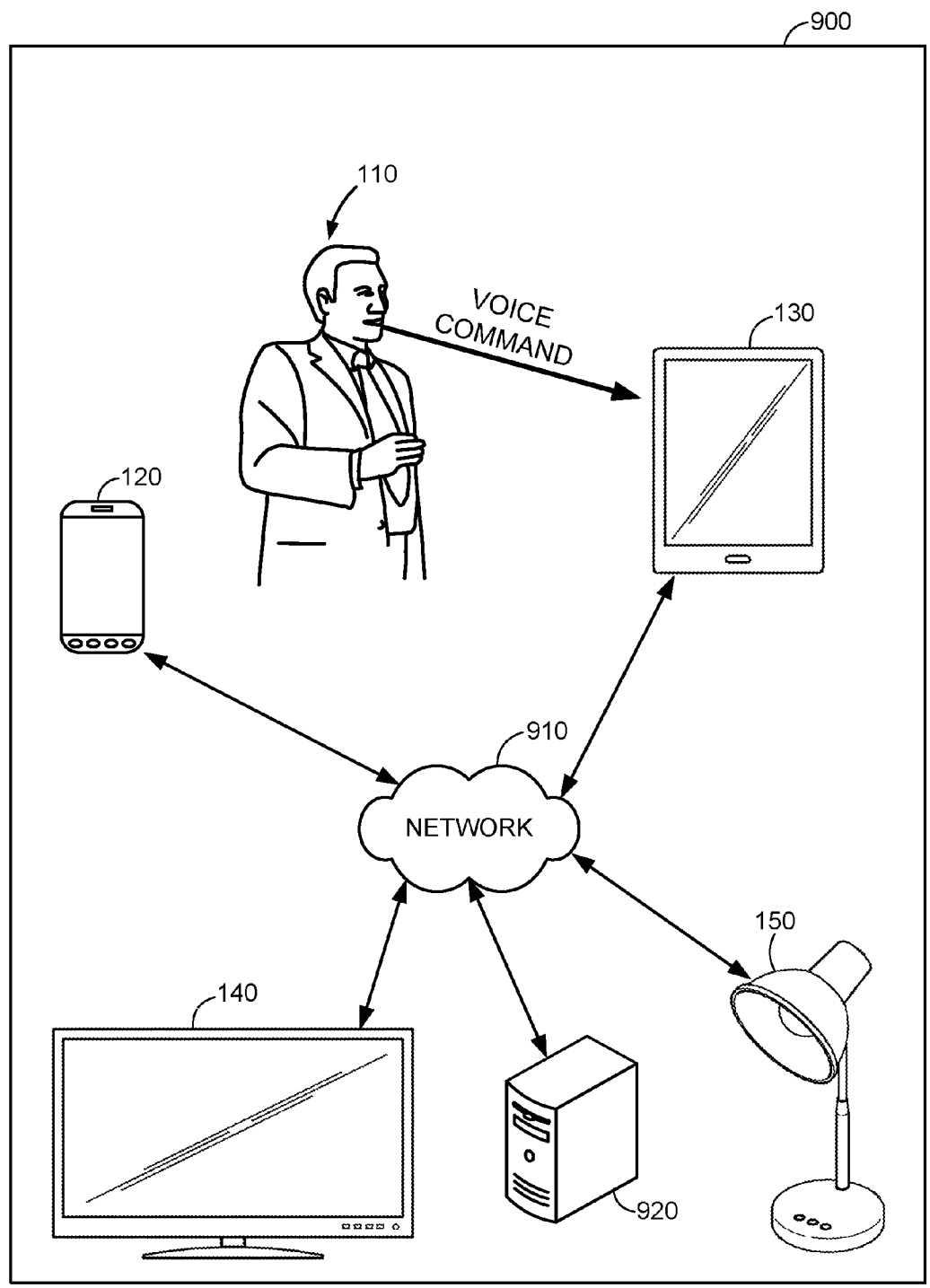
FIG. 9 illustrates a plurality of electronic devices configured to communicate with a server 920 via a communication network for determining an intended target of a speech spoken by a user, according to one embodiment of the present disclosure.

FIG. 9 illustrates the plurality of electronic devices 120 to 150 configured to communicate with a server 920 via a communication network 910 for determining an intended target of a speech spoken by the user 110, according to one embodiment of the present disclosure. In the illustrated embodiment, the electronic devices 120 to 150 are a smartphone, a tablet computer, a smart TV, and a voice-controlled lighting device, respectively, and may be located in a room 900. Although the electronic devices 120 to 150 are shown in the room 900, any number of electronic devices may be located in the room 900 or any other suitable location in proximity to the user 110.

In the illustrated embodiment, the user 110 may speak a voice command in a direction toward the electronic device 130 to activate the electronic device 130 or instruct the electronic device 120 to perform a function. In this case, each of the electronic devices 120 to 150 may receive the voice command as an input sound and detect speech in the input sound. Upon detecting the speech, each of the electronic devices 120 to 150 may calculate a ratio between first characteristics of a first frequency range (e.g., an energy value of a high frequency range) and second characteristics of a second frequency range (e.g., an energy value of a low frequency range) of the speech.

The calculated ratios may then be sent to the server 920 via the communication network 910. In one embodiment, the communication network 910 may be a wired network or a wireless network. Upon receiving the ratios, the server 920 may compare the ratios received from the electronic devices 120 to 150 and determine that the electronic device having the highest ratio is the intended target device for the voice command.

Additionally, the server 920 may be configured to compare the highest ratio with a threshold value, which may be a predetermined value. For example, the threshold value may be determined as an optimal value for reducing a false alarm and enhancing accuracy of detection. When the highest ratio is greater than or equal to the threshold value, the server 920 may determine that the electronic device having the highest ratio is the intended target device for the voice command. On the other hand, when the highest ratio is less than the threshold value, the server 920 may determine that none of the electronic devices are the intended target device for the voice command.

In the illustrated embodiment, the server 920 may determine that the ratio received from the electronic device 130 is the highest ratio among the ratios received from the electronic devices 120 to 150 since the user has spoken the voice command in a direction toward the electronic device 130. In response, the server 920 may send a message to the electronic device 130 indicating that it is the intended target device for the voice command. Upon receiving the message, the electronic device 130 may proceed to recognize the voice command and perform a function associated with the voice command.

Figure 10:
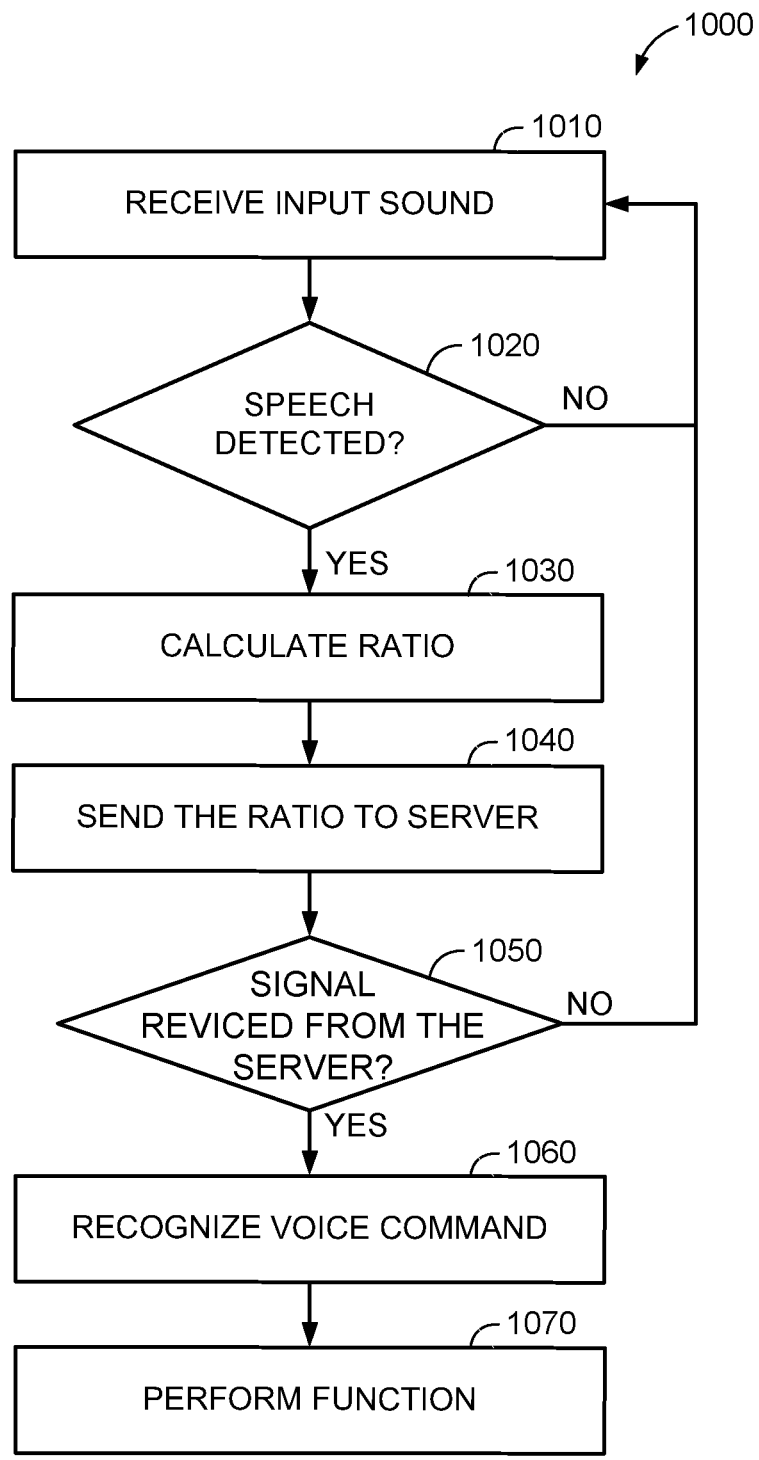
FIG. 10 illustrates a flowchart of an exemplary method for controlling an electronic device in response to speech spoken by a user in connection with a server, according to one embodiment of the present disclosure.

FIG. 10 illustrates a flowchart of an exemplary method 1000 for controlling an electronic device in response to speech spoken by a user in connection with a server, according to one embodiment of the present disclosure. Initially, the electronic device (e.g., one of the electronic devices 120 to 150 in FIG. 1) may receive speech including a voice command as an input sound via a sound sensor (e.g., a microphone) at 1010. At 1020, the electronic device may determine whether speech is detected in the received input sound. The electronic device may detect speech by using any methods such as a Gaussian mixture model (GMM) based classifier, a neural network, a Hidden Markov model (HMM), a graphical model, a Support Vector Machine (SVM), and the like. If speech is not detected (i.e., NO at 1020), the method 1000 may proceed back to 1010 to receive another input sound via the sound sensor.

When speech is detected in the received input sound (i.e., YES at 1020), the electronic device may calculate a ratio between first characteristics of a first frequency range (e.g., an energy value of a high frequency range) and second characteristics of a second frequency range (e.g., an energy value of a low frequency range) of the speech at 1030. The calculated ratio may be indicative of a probability that the direction of departure of the speech is toward itself. At 1040, the electronic device may send the calculated ratio to a server.

After sending the ratio to the server, the electronic device may determine whether a message indicating that it is the intended target device of the voice command is received from the server within a specified time period at 1050. If the electronic device does not receive the signal from the server during the specified time period, the method 1000 may proceed back to 1010 to receive another input sound via the sound sensor. On the other hand, if the electronic device receives the signal from the server within the specified period, the electronic device may recognize the voice command in the speech at 1060. Once the voice command in the speech is recognized, the electronic device may perform a function associated with the voice command at 1070.

Figure 11:
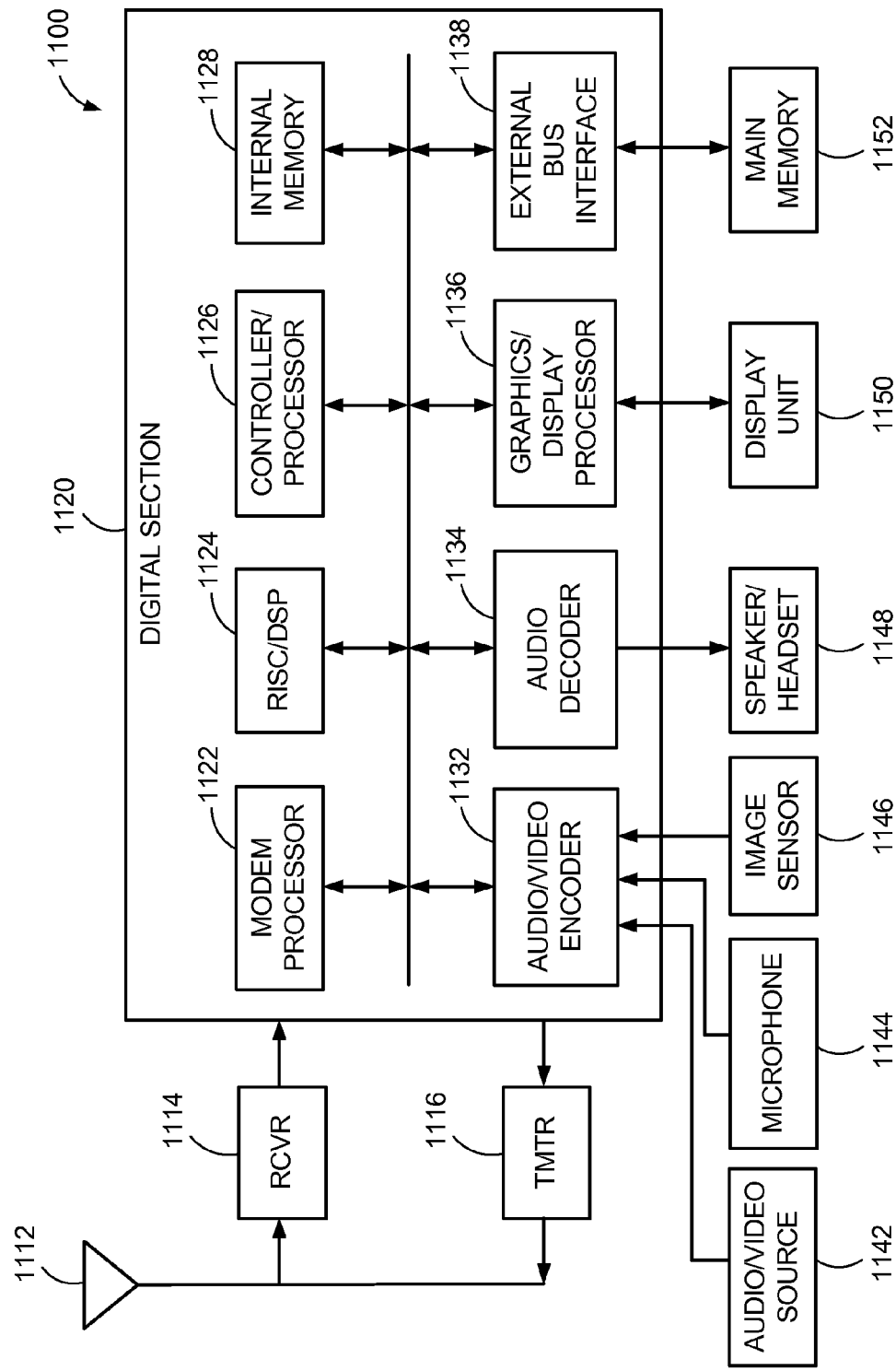
FIG. 11 illustrates a block diagram of an electronic device in which the methods and apparatus of the present disclosure for controlling an electronic device in response to speech spoken by a user may be implemented according to some embodiments.

FIG. 11 illustrates a block diagram of an electronic device 1100 in which the methods and apparatus of the present disclosure for controlling an electronic device in response to speech spoken by a user may be implemented according to some embodiments. The electronic device 1100 may be a cellular phone, a smartphone, a wearable computer, a smart watch, smart glasses, a tablet personal computer, a terminal, a handset, a personal digital assistant (PDA), a wireless modem, a cordless phone, a tablet, and so on. The wireless communication system may be a CDMA system, a GSM system, a W-CDMA system, a LTE system, a LTE Advanced system, and so on.

The electronic device 1100 may be capable of providing bidirectional communication via a receive path and a transmit path. On the receive path, signals transmitted by base stations may be received by an antenna 1112 and may be provided to a receiver (RCVR) 1114. The receiver 1114 may condition and digitize the received signal, and provide the conditioned and digitized digital signal to a digital section for further processing. On the transmit path, a transmitter (TMTR) 1116 may receive data to be transmitted from a digital section 1120, process and condition the data, and generate a modulated signal, which is transmitted via the antenna 1112 to the base stations. The receiver 1114 and the transmitter 1116 may be part of a transceiver that may support CDMA, GSM, W-CDMA, LTE, LTE Advanced, and so on.

The digital section 1120 may include various processing, interface, and memory units such as, for example, a modem processor 1122, a reduced instruction set computer/digital signal processor (RISC/DSP) 1124, a controller/processor 1126, an internal memory 1128, a generalized audio/video encoder 1132, a generalized audio decoder 1134, a graphics/display processor 1136, and an external bus interface (EBI) 1138. The modem processor 1122 may perform processing for data transmission and reception, e.g., encoding, modulation, demodulation, and decoding. The RISC/DSP 1124 may perform general and specialized processing for the electronic device 1100. The controller/processor 1126 may perform the operation of various processing and interface units within the digital section 1120. The internal memory 1128 may store data and/or instructions for various units within the digital section 1120.

The generalized audio/video encoder 1132 may perform encoding for input signals from an audio/video source 1142, a microphone 1144, an image sensor 1146, etc. The generalized audio decoder 1134 may perform decoding for coded audio data and may provide output signals to a speaker/headset 1148. The graphics/display processor 1136 may perform processing for graphics, videos, images, and texts, which may be presented to a display unit 1150. The EBI 1138 may facilitate transfer of data between the digital section 1120 and a main memory 1152.

The digital section 1120 may be implemented with one or more processors, DSPs, microprocessors, RISCs, etc. The digital section 1120 may also be fabricated on one or more application specific integrated circuits (ASICs) and/or some other type of integrated circuits (ICs).

Figure 12:
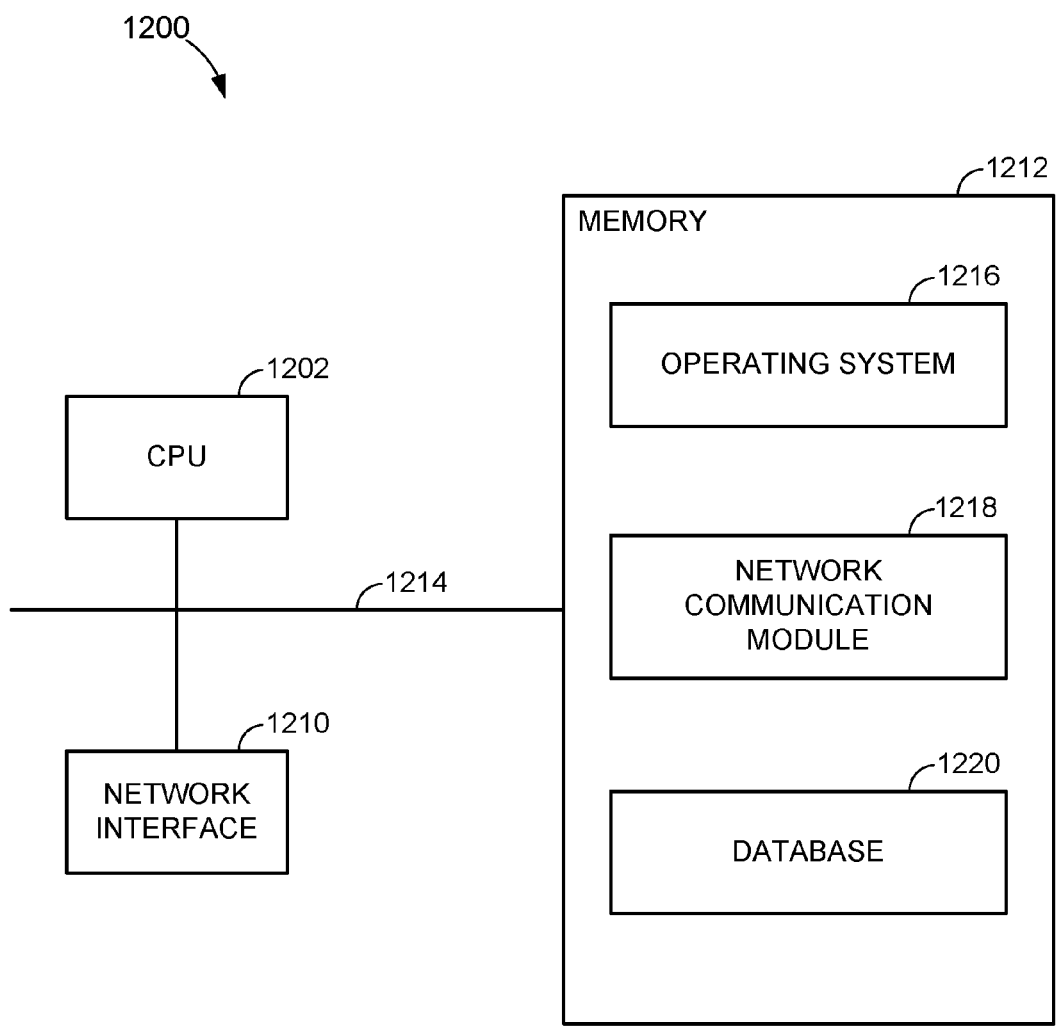
FIG. 12 is a block diagram illustrating a server system, which may be any one of the servers previously described implemented according to some embodiments.

FIG. 12 is a block diagram illustrating a server system 1200, which may be any one of the servers previously described implemented according to some embodiments. The server system 1200 may include one or more processing units (e.g., CPUs) 1202, one or more network or other communications network interfaces, a memory 1212, and one or more communication buses 1214 for interconnecting these components. The server system 1200 may also include a user interface (not shown) having a display device and a keyboard.

The memory 1212 may be any suitable memory, such as a high-speed random access memory, (e.g., DRAM, SRAM, DDR RAM or other random access solid state memory devices). The memory 1212 may include or may alternatively be non-volatile memory (e.g., one or more magnetic disk storage devices, optical disk storage devices, flash memory devices, or other non-volatile solid state storage devices). In some embodiments, the memory 1212 may include one or more storage devices remotely located from the CPU(s) 1202 and/or remotely located in multiple sites.

Any one of the above memory devices represented by the memory 1212 may store any number of modules or programs that corresponds to a set of instructions for performing and/or executing any of the processes, operations, and methods previously described. For example, the memory 1212 may include an operating system 1216 configured to store instructions that includes procedures for handling various basic system services and for performing hardware dependent tasks. A network communication module 1218 of the memory 1212 may be used for connecting the server system 1200 to other computers via the one or more communication network interfaces 1210 (wired or wireless) and one or more communication networks, such as the Internet, other wide area networks, local area networks, metropolitan area networks, and so on.

The memory 1212 may also include a database 1220 configured to include language models, acoustic models, grammar models, or the like. Each of the models the database may be used for recognizing speech and/or commands of one or more users. The operating system 1216 may update the database 1220 through the network communication module 1218. The operating system 1216 may also provide a message indicating that an electronic device is an intended target device for a voice command via the network communication module 1218.

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored at a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. For example, a computer-readable storage medium may be a non-transitory computer-readable storage device that includes instructions that are executable by a processor. Thus, a computer-readable storage medium may not be a signal.

The previous description of the disclosure is provided to enable a person skilled in the art to make or use the disclosure. Various modifications to the disclosure will be readily apparent to those skilled in the art, and the generic principles defined herein are applied to other variations without departing from the scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1212 may store additional modules and data structures not described above.

Aspects of the Present Disclosure

Hereinafter, some aspects of the present disclosure will be additionally stated.

Example 1

According to an aspect of the present disclosure, there is provided a method for controlling an electronic device in response to speech spoken by a user including receiving an input sound by a sound sensor; detecting the speech spoken by the user in the input sound; determining first characteristics of a first frequency range and second characteristics of a second frequency range of the speech in response to detecting the speech in the input sound; and determining whether a direction of departure of the speech spoken by the user is toward the electronic device based on the first and second characteristics.

Example 2

In the method of Example 1, the first frequency range is higher than the second frequency range.

Example 3

In the method of Example 1 or 2, the first and second frequency ranges include at least one frequency.

Example 4

The method of any one of Examples 1 to 3 further includes recognizing a voice command in the speech in response to determining that the direction of departure of the speech is toward the electronic device; and performing a function associated with the recognized voice command.

Example 5

In the method of any one of Examples 1 to 4, determining first characteristics of a first frequency range and second characteristics of a second frequency range of the speech comprises determining a first energy value of the first frequency range as the first characteristics; and determining a second energy value of the second frequency range as the second characteristics.

Example 6

In the method of any one of Examples 1 to 5, determining whether a direction of departure of the speech is toward the electronic device comprises determining a ratio between the first energy value and the second energy value; and determining that the direction of departure of the speech is toward the electronic device based on the ratio.

Example 7

In the method of any one of Examples 1 to 6, the ratio is independent of signal intensity of the input sound.

Example 8

The method of any one of Examples 1 to 7 further includes receiving an indication of a spoken direction of the speech from an external device.

Example 9

The method of any one of Examples 1 to 8 further includes determining whether a target of the speech is the electronic device or the external device based on the first and second characteristics and the indication from the external device; recognizing a voice command in the speech in response to determining that the target of the speech is the electronic device; and performing a function associated with the recognized voice command.

Example 10

According to another aspect of the present disclosure, there is provided an including a sound sensor configured to receive an input sound; a speech detector configured to detect speech spoken by a user in the input sound; a frequency analyzing unit configured to determine first characteristics of a first frequency range and second characteristics of a second frequency range of the speech in response to detecting the speech in the input sound; and a speech direction determining unit configured to to determine whether a direction of departure of the speech spoken by the user is toward the electronic device based on the first and second characteristics.

Example 11

In the electronic device of Example 10, the first frequency range is higher than the second frequency range.

Example 12

In the electronic device of Example 10 or 11, the first and second frequency ranges include at least one frequency.

Example 13

The electronic device of any one of Examples 10 to 12 further includes a speech recognition unit configured to recognize a voice command in the speech in response to determining that the direction of departure of the speech is toward the electronic device, wherein the electronic device performs a function associated with the recognized voice command.

Example 14

In the electronic device of any one of Examples 10 to 13, the frequency analyzing unit is configured to determine a first energy value of the first frequency range as the first characteristics; and determine a second energy value of the second frequency range as the second characteristics.

Example 15

In the electronic device of any one of Examples 10 to 14, the speech direction determining unit is configured to determine a ratio between the first energy value and the second energy value; and determine that the direction of departure of the speech is toward the electronic device based on the ratio.

Example 16

In the electronic device of any one of Examples 10 to 15, the ratio is independent of signal intensity of the input sound.

Example 17

The electronic device of any one of Examples 10 to 16 further includes a communication unit configured to receive an indication of a spoken direction of the speech from an external device.

Example 18

In the electronic device of any one of Examples 10 to 17, the speech direction determining unit is configured to determine whether a target of the speech is the electronic device or the external device based on the first and second characteristics and the indication from the external device, wherein the electronic device further comprises: a speech recognition unit configured to recognize a voice command in the speech in response to determining that the target of the speech is the electronic device, and the electronic device performs a function associated with the recognized voice command.

Example 19

According to still another aspect of the present disclosure, there is provided an electronic device including means for receiving an input sound; means for detecting speech spoken by a user in the input sound; means for determining first characteristics of a first frequency range and second characteristics of a second frequency range of the speech in response to detecting the speech in the input sound; and means for determining whether a direction of departure of the speech spoken by the user is toward the electronic device based on the first and second characteristics.

Example 20

The electronic device of Example 19 further includes means for recognizing a voice command in the speech in response to determining that the direction of departure of the speech is toward the electronic device; and means for performing a function associated with the recognized voice command.

Example 21

In the electronic device of Example 19 or 20, the means for determining first characteristics of a first frequency range and second characteristics of a second frequency range of the speech is configured to determine a first energy value of the first frequency range as the first characteristics; and determine a second energy value of the second frequency range as the second characteristics.

Example 22

In the electronic device of any one of Examples 19 to 21, the means for determining whether a direction of departure of the speech spoken by the user is toward the electronic device is configured to determine a ratio between the first energy value and the second energy value; and determine that the direction of departure of the speech is toward the electronic device based on the ratio.

Example 23

The electronic device of any one of Examples 19 to 22 further includes means for receiving an indication of a spoken direction of the speech from an external device.

Example 24

In the electronic device of any one of Examples 19 to 23, the means for determining whether a direction of departure of the speech spoken by the user is toward the electronic device is configured to determine whether a target of the speech is the electronic device or the external device based on the first and second characteristics and the indication from the external device, and the electronic device further comprises means for recognizing a voice command in the speech in response to determining that the target of the speech is the electronic device; and means for performing a function associated with the recognized voice command.

Example 25

According to yet another aspect of the present disclosure, there is provided a non-transitory computer-readable storage medium comprising instructions causing at least one processor of an electronic device to perform operations of receiving an input sound by a sound sensor; detecting speech spoken by a user in the input sound; determining first characteristics of a first frequency range and second characteristics of a second frequency range of the speech in response to detecting the speech in the input sound; and determining whether a direction of departure of the speech spoken by the user is toward the electronic device based on the first and second characteristics.

Example 26

The non-transitory computer-readable storage medium of Example 25 further comprises instructions causing the at least one processor of the electronic device to perform operations of recognizing a voice command in the speech in response to determining that the direction of departure of the speech is toward the electronic device; and performing a function associated with the recognized voice command.

Example 27

In the non-transitory computer-readable storage medium of Example 25 or 26, determining first characteristics of a first frequency range and second characteristics of a second frequency range of the speech comprises determining a first energy value of the first frequency range as the first characteristics; and determining a second energy value of the second frequency range as the second characteristics.

Example 28

In the non-transitory computer-readable storage medium of any one of Examples 25 to 27, determining whether a direction of departure of the speech is toward the electronic device comprises determining a ratio between the first energy value and the second energy value; and determining that the direction of departure of the speech is toward the electronic device based on the ratio.

Example 29

The non-transitory computer-readable storage medium of any one of Examples 25 to 28 further comprises instructions causing the at least one processor of the electronic device to perform operations of receiving an indication of a spoken direction of the speech from an external device.

Example 30

The non-transitory computer-readable storage medium of any one of Examples 25 to 29 further comprises instructions causing the at least one processor of the electronic device to perform operations of determining whether a target of the speech is the electronic device or the external device based on the first and second characteristics and the indication from the external device; recognizing a voice command in the speech in response to determining that the target of the speech is the electronic device; and performing a function associated with the recognized voice command.

What is claimed:
1. A method for processing speech spoken by a user, the method comprising:
at an electronic device that includes a processor, performing:
receiving an input sound by a sound sensor;
detecting the speech in the input sound;
determining first characteristics of an identified first frequency range of the speech and second characteristics of an identified second frequency range of the speech in response to detecting the speech, the second frequency range differing from the first frequency range;
determining, by a speech direction determining unit of the processor, whether a direction of departure of the speech is toward the electronic device based on the first characteristics and based on the second characteristics, the processor configured to recognize a command in the speech based on an indication of speech direction detection; and
initiating a function associated with the recognized command at the electronic device in response to determining that the direction of departure of the speech is toward the electronic device based on the first characteristics and based on the second characteristics.
2. The method of claim 1, wherein the first frequency range is higher than the second frequency range, and wherein the indication includes one or more of a ratio, a spectral flatness value, or a message from an external device indicating that the electronic device is a target device for the command.

3. The method of claim 1, further comprising:
recognizing the command in the speech in response to determining that the direction of departure of the speech is toward the electronic device; and
performing the function associated with the recognized command.

4. The method of claim 1, wherein:
the first characteristics include a first energy value associated with the first frequency range, and
the second characteristics include a second energy value associated with the second frequency range.

5. The method of claim 4, wherein determining whether the direction of departure of the speech is toward the electronic device comprises:
determining a ratio between the first energy value and the second energy value, wherein the ratio is independent of signal intensity of the input sound; and
determining that the direction of departure of the speech is toward the electronic device based on the ratio.

6. The method of claim 1, wherein:
the first frequency range and the second frequency range are identified by a frequency analyzing unit of the processor, and
the speech direction determining unit determines whether a target of the speech is the electronic device or an external device based on the first characteristics, the second characteristics, and the indication.

7. The method of claim 1, wherein detecting the speech, determining the first characteristics and the second characteristics, determining whether the direction of departure of the speech is toward the electronic device, and initiating the function are performed within a device that comprises a mobile communication device.

8. The method of claim 1, wherein detecting the speech, determining the first characteristics and the second characteristics, determining whether the direction of departure of the speech is toward the electronic device, and initiating the function are performed within a device that comprises a fixed location communication device.

9. An electronic device, comprising:
a sound sensor configured to receive an input sound;
a speech detector configured to detect speech spoken by a user in the input sound;
a frequency analyzer configured to determine first characteristics of an identified first frequency range of the speech and second characteristics of an identified second frequency range of the speech in response to detecting the speech, the second frequency range differing from the first frequency range;
a processor including a speech direction determiner configured to determine, based on the first characteristics and based on the second characteristics, whether a direction of departure of the speech is toward the electronic device, the processor configured to recognize a command in the speech based on an indication of speech direction detection; and
circuitry configured to initiate a function associated with the recognized command at the electronic device in response to a determination that the direction of departure of the speech is toward the electronic device based on the first characteristics and based on the second characteristics.

10. The electronic device of claim 9, wherein the first frequency range is higher than the second frequency range.

11. The electronic device of claim 9, wherein the speech direction determiner is configured to determine that the direction of departure of the speech is toward the electronic device based on a ratio associated with the first characteristics and the second characteristics.

12. The electronic device of claim 9, further comprising:
a speech recognizer configured to recognize a voice command in the speech in response to determining that the direction of departure of the speech is toward the electronic device.

13. The electronic device of claim 9, wherein:
the first characteristics include a first energy value associated with the first frequency range,
the second characteristics include a second energy value associated with the second frequency range, and
the speech direction determiner is configured to determine a ratio between the first energy value and the second energy value, the ratio independent of signal intensity of the input sound, and to determine that the direction of departure of the speech is toward the electronic device based on the ratio.

14. The electronic device of claim 9, further comprising:
a frequency analyzing circuit configured to identify the first frequency range and the second frequency range.

15. The electronic device of claim 9, wherein the speech direction determiner is configured to determine whether a target of the speech is the electronic device or an external device based on the first characteristics, the second characteristics, and the indication.

16. The electronic device of claim 9, further comprising:
an antenna; and
a receiver coupled to the antenna and configured to receive a signal corresponding to a particular input sound.

17. The electronic device of claim 16, wherein the speech detector, the frequency analyzer, the speech direction determiner, the circuitry, the receiver, and the antenna are integrated into a mobile communication device.

18. The electronic device of claim 16, wherein the speech detector, the frequency analyzer, the speech direction determiner, the circuitry, the receiver, and the antenna are integrated into a fixed location communication device.

19. An electronic device, comprising:
means for receiving an input sound;
means for detecting speech spoken by a user in the input sound;
means for determining first characteristics of an identified first frequency range of the speech and second characteristics of an identified second frequency range of the speech in response to detecting the speech, the second frequency range differing from the first frequency range;
means for processing information, the means for processing information including means for determining a direction of the speech and being configured to recognize a command in the speech based on an indication of speech direction detection, wherein the means for determining the direction of the speech is configured to determine whether a direction of departure of the speech is toward the electronic device based on the first characteristics and based on the second characteristics; and
means for initiating a function associated with the recognized command at the electronic device in response to the determination of whether the direction of departure of the speech is toward the electronic device based on the first characteristics and based on the second characteristics.

20. The electronic device of claim 19, further comprising:
means for recognizing a voice command in the speech in response to determining that the direction of departure of the speech is toward the electronic device.

21. The electronic device of claim 19, wherein:
the first characteristics include a first energy value associated with the first frequency range, and
the second characteristics include a second energy value associated with the second frequency range.

22. The electronic device of claim 21, wherein the means for determining the direction of the speech is configured to:
determine a ratio between the first energy value and the second energy value; and
determine that the direction of departure of the speech is toward the electronic device based on the ratio.

23. The electronic device of claim 19, wherein the means for determining the direction of the speech is configured to determine whether a target of the speech is the electronic device or an external device based on the first characteristics, the second characteristics, and the indication.

24. The electronic device of claim 19, wherein the means for detecting the speech, the means for determining the first characteristics and the second characteristics, the means for determining the direction of the speech, and the means for initiating are integrated into a mobile communication device.

25. The electronic device of claim 19, wherein the means for detecting the speech, the means for determining the first characteristics and the second characteristics, the means for determining the direction of the speech, and the means for initiating are integrated into a fixed location communication device.

26. A non-transitory computer-readable storage medium comprising instructions causing at least one processor of an electronic device to perform operations of:
receiving an input signal based on an input sound received by a sound sensor, the input signal having an identified first frequency range and an identified second frequency range, the second frequency range differing from the first frequency range;
detecting speech spoken by a user in the input signal;
determining first characteristics of the input signal associated with the first frequency range and second characteristics of the input signal associated with the second frequency range in response to detecting the speech;
determining whether a direction of departure of the speech is toward the electronic device based on the first characteristics of the input signal and based on the second characteristics of the input signal, the instructions configured to cause the at least one processor to recognize a command in the speech based on an indication of speech direction detection; and
initiating a function associated with the recognized command at the electronic device in response to determining that the direction of departure of the speech is toward the electronic device based on the first characteristics and based on the second characteristics.

27. The non-transitory computer-readable storage medium of claim 26, further comprising instructions causing the at least one processor to recognize a voice command in the input signal in response to determining that the direction of departure of the speech is toward the electronic device.

28. The non-transitory computer-readable storage medium of claim 26, wherein
the first characteristics of the input signal include a first energy value associated with the first frequency range, and
the second characteristics of the input signal include a second energy value associated with the second frequency range.

29. The non-transitory computer-readable storage medium of claim 26, wherein determining whether the direction of departure of the speech is toward the electronic device comprises:
determining a ratio between the first characteristics of the input signal and the second characteristics of the input signal; and
determining that the direction of departure of the speech is toward the electronic device based on the ratio.

30. The non-transitory computer-readable storage medium of claim 26, further comprising instructions causing the at least one processor to perform operations of:
identifying the first frequency range and the second frequency range; and
determining whether a target of the speech is the electronic device based on the first characteristics of the input signal, the second characteristics of the input signal, and the indication.

* * * * *